US009714618B2

United States Patent
Byrd et al.

(10) Patent No.: US 9,714,618 B2
(45) Date of Patent: Jul. 25, 2017

(54) METHOD AND SYSTEM FOR IMPROVING STARTING OF A TURBOCHARGED ENGINE

(75) Inventors: Kevin Durand Byrd, Royal Oak, MI (US); Keith Michael Plagens, Northville, MI (US); William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 831 days.

(21) Appl. No.: 13/598,427

(22) Filed: Aug. 29, 2012

(65) Prior Publication Data

US 2014/0067227 A1    Mar. 6, 2014

(51) Int. Cl.
| | |
|---|---|
| F02B 33/44 | (2006.01) |
| F02D 41/00 | (2006.01) |
| F02B 37/10 | (2006.01) |
| F02D 41/06 | (2006.01) |
| F02D 41/14 | (2006.01) |
| F02B 39/16 | (2006.01) |

(52) U.S. Cl.
CPC ......... *F02D 41/0007* (2013.01); *F02B 37/10* (2013.01); *F02B 2039/168* (2013.01); *F02D 41/064* (2013.01); *F02D 41/1497* (2013.01); *F02D 2200/703* (2013.01); *Y02T 10/144* (2013.01)

(58) Field of Classification Search
CPC ...... Y02T 10/144; F01N 3/28; F02B 29/0418; F02B 33/40; F02B 37/00; F02B 37/10; F02D 41/0007; F02D 23/00
USPC ....................................... 701/103
See application file for complete search history.

(56) References Cited

U.S. PATENT DOCUMENTS

| | | | | |
|---|---|---|---|---|
| 1,351,006 A | * | 8/1920 | Schneider | 188/71.5 |
| 1,781,869 A | * | 11/1930 | Bragg et al. | 188/357 |
| 2,461,759 A | * | 2/1949 | Nelson et al. | 188/171 |
| 4,703,625 A | * | 11/1987 | Caldwell | 60/602 |
| 4,884,407 A | | 12/1989 | Hatanaka | |
| 4,897,998 A | | 2/1990 | Sekiyama et al. | |
| 5,133,188 A | | 7/1992 | Okada | |
| 5,142,868 A | | 9/1992 | Woon et al. | |
| 6,539,716 B2 | | 4/2003 | Finger et al. | |
| 6,637,204 B2 | | 10/2003 | Ellmer et al. | |

(Continued)

FOREIGN PATENT DOCUMENTS

| | | |
|---|---|---|
| CN | 102046940 A | 5/2011 |
| EP | 1004760 A2 | 11/1999 |
| JP | 2006194170 A | 7/2006 |

OTHER PUBLICATIONS

Ruona, William Charles et al., "Method and System for Operating an Engine Turbocharger," U.S. Appl. No. 13/598,396, filed Aug. 29, 2012, 32 pages.
Stanek, Joe F. et al., "Method and System for Improving Stopping and Starting of a Turbocharged Engine," U.S. Appl. No. 13/598,473, filed Aug. 29, 2012, 45 pages.

(Continued)

*Primary Examiner* — Hai Huynh
*Assistant Examiner* — Gonzalo LaGuarda
(74) *Attorney, Agent, or Firm* — Julia Voutyras; McCoy Russell LLP

(57) ABSTRACT

A system and method for improving engine emissions is described. In one example, engine emissions may be improved via increasing rotational resistance of a turbocharger while a temperature of an exhaust after treatment device is less than a threshold temperature. The system and method may reduce an amount of time for the after treatment device to reach an operating temperature.

14 Claims, 5 Drawing Sheets

(56) References Cited

U.S. PATENT DOCUMENTS

| | | | |
|---|---|---|---|
| 7,051,527 B2 | 5/2006 | Schmid et al. | |
| 7,637,106 B2 | 12/2009 | Hertweck et al. | |
| 7,801,665 B2 | 9/2010 | Buckland et al. | |
| 8,316,642 B2 | 11/2012 | McEwan et al. | |
| 8,347,613 B2 | 1/2013 | Van Nieuwstadt | |
| 8,925,302 B2* | 1/2015 | Ruona et al. | 60/280 |
| 2002/0078934 A1 | 6/2002 | Hohkita et al. | |
| 2004/0025506 A1* | 2/2004 | Shaffer | 60/608 |
| 2006/0032225 A1* | 2/2006 | Dyne et al. | 60/607 |
| 2006/0064981 A1* | 3/2006 | Kojima et al. | 60/612 |
| 2006/0236692 A1* | 10/2006 | Kolavennu et al. | 60/602 |
| 2007/0234982 A1 | 10/2007 | Kolmanovsky et al. | |
| 2007/0234984 A1* | 10/2007 | Kolmanovsky et al. | 123/90.15 |
| 2007/0234985 A1 | 10/2007 | Kolmanovsky | |
| 2008/0190107 A1 | 8/2008 | Ogiso | |
| 2009/0211245 A1 | 8/2009 | Mcewan et al. | |
| 2009/0259388 A1* | 10/2009 | Vetrovec | 701/103 |
| 2009/0292446 A1 | 11/2009 | Tanaka | |
| 2010/0011764 A1 | 1/2010 | Andrews | |
| 2010/0077745 A1* | 4/2010 | Robinson | 60/602 |
| 2011/0107739 A1* | 5/2011 | Shimizu et al. | 60/273 |
| 2014/0090373 A1* | 4/2014 | Timmons | 60/605.1 |

OTHER PUBLICATIONS

Partial Translation of Office Action of Chinese Application No. 2013103438441, Issued Jul. 23, 2015, State Intellectual Property Office of PRC, 7 pages.

Partial Translation of Office Action of Chinese Patent Application No. 201310343897.3, Issued Nov. 23, 2016, State Intellectual Property Office of PRC, 9 pages.

\* cited by examiner

METHOD AND SYSTEM FOR IMPROVING STARTING OF A TURBOCHARGED ENGINE

BACKGROUND/SUMMARY

A turbocharged engine offers performance benefits of a larger naturally aspirated engine. However, cold start emissions of a turbocharged engine may be greater than desired because a turbine within the turbocharger may extract heat energy from engine exhaust gases before the exhaust gases reach an after treatment device. Consequently, less exhaust energy reaches the exhaust after treatment device and the amount of time for the exhaust after treatment device to reach operating temperature increases. One way to increase the amount of exhaust energy that reaches the after treatment device is to retard engine spark timing and increase engine air mass flow rate. Nevertheless, the after treatment device may not reach operating temperature soon enough to pass stringent vehicle emission levels. Further, increasing spark retard and engine air mass flow rate increases fuel consumption and therefore may be undesirable.

The inventors herein have recognized the above-mentioned limitations and have developed an engine system, comprising: an engine; a turbocharger coupled to the engine, the turbocharger including a device for increasing and decreasing rotational resistance of the turbocharger; and a controller including non-transient instructions to adjust the rotational resistance of the turbocharger via the device in response to a temperature of an after treatment device being less than a threshold temperature.

By increasing the rotational resistance of a turbocharger turbine, it may be possible to reduce an amount of time for an after treatment device to reach an operating temperature. In particular, increasing rotational resistance of a turbocharger turbine can limit turbocharger rotation so that engine exhaust gases are exposed to less surface area within the turbocharger. Therefore, less exhaust energy may be imparted to the turbocharger so that more exhaust energy may be imparted to a catalyst positioned downstream of the turbocharger. The additional exhaust gas energy supplied to the catalyst may reduce engine emissions. In this way, engine emissions may be reduced without having to further retard spark timing and increase engine air flow.

The present description may provide several advantages. For example, the approach may reduce engine emissions during an engine cold start. Further, the approach may reduce fuel consumption by reducing catalyst light off time so that an amount of time the engine is operated less efficiently may be reduced. Further still, the approach may allow the engine to operate with greater combustion stability during engine starting so as to reduce rough engine idling.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
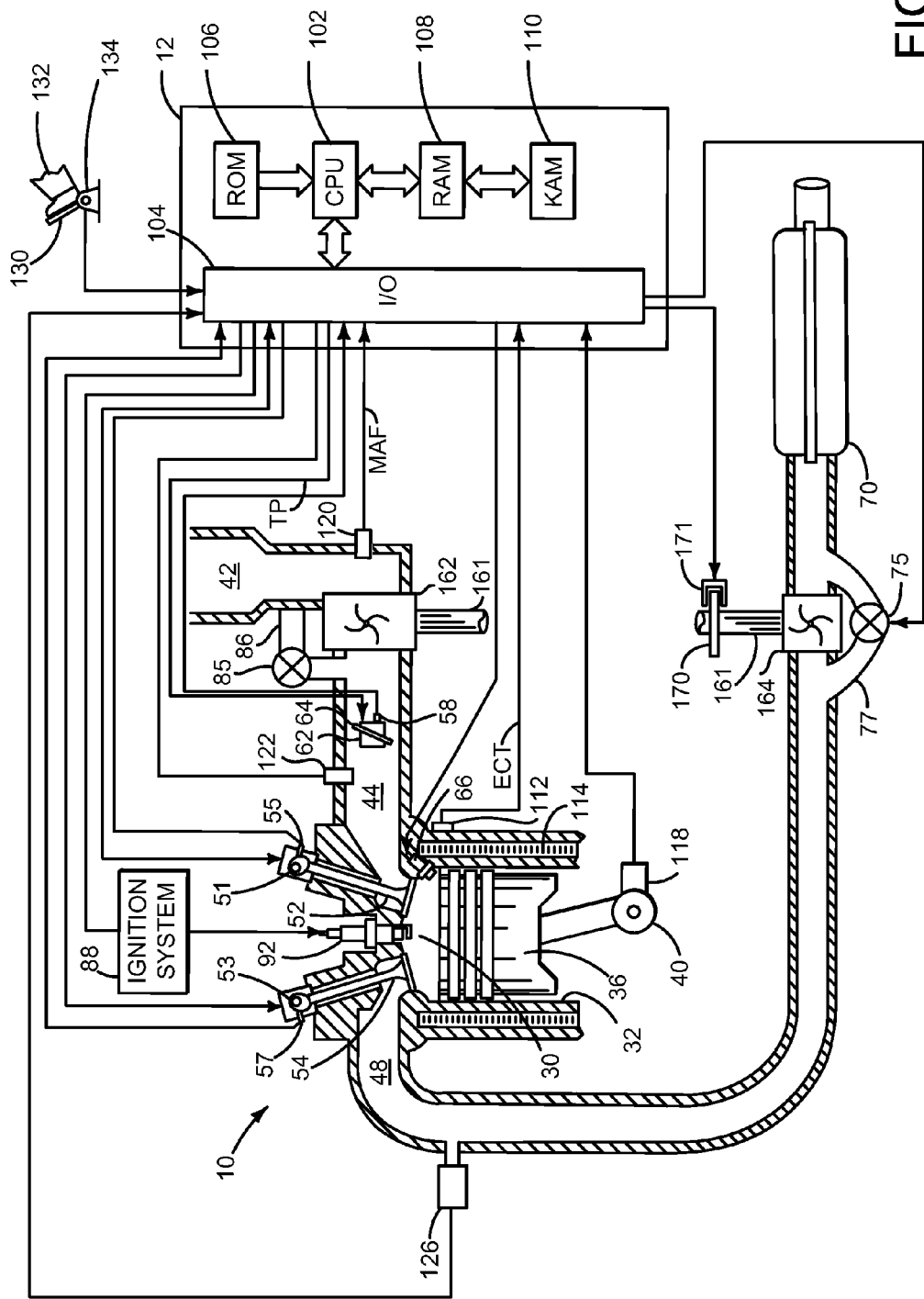
FIG. 1 shows a schematic depiction of an engine.

The present description is related to starting a turbocharged engine. In one example, the turbocharged engine may be started in a way that transfers additional exhaust gas energy to an emissions device. The approach may conserve fuel and improve engine combustion stability during cold idle conditions. One example system is shown in FIG. 1. The engine and exhaust system may be operated to provide the sequence of FIG. 6 via the method shown in FIG. 7. The method includes increasing rotational resistance of a turbocharger turbine during engine starting so that less exhaust gas energy is transferred to the turbocharger. FIGS. 2-5 show example devices for increasing turbine rotational resistance.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided by controller 12. Fuel is delivered to fuel injector 66 by a fuel system (not shown) including a fuel tank, fuel pump, and fuel rail (not shown).

Intake manifold 44 is supplied air by compressor 162. Exhaust gases rotate turbine 164 which is coupled to shaft 161, thereby driving compressor 162. In some examples, a bypass passage 77 is included so that exhaust gases may bypass turbine 164 during selected operating conditions. Flow through bypass passage 77 is regulated via waste gate 75. Further, a compressor bypass passage 86 may be provided in some examples to limit pressure provided by compressor 162. Flow though bypass passage 86 is regulated via valve 85. In this example, rotor 170 is coupled to shaft 161 for increasing rotational resistance of shaft 161, turbine 164, and compressor 162. Turbocharger brake caliper 171 selectively provides a braking force to rotor 170. In addition, intake manifold 44 is shown communicating with central throttle 62 which adjusts a position of throttle plate 64 to control air flow from engine air intake 42. Central throttle 62 may be electrically operated.

Distributorless ignition system 88 provides an ignition spark to combustion chamber 30 for igniting an air-fuel mixture via spark plug 92 in response to controller 12. In other examples, the engine may be a compression ignition engine without an ignition system such as a diesel engine. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Figure 2:
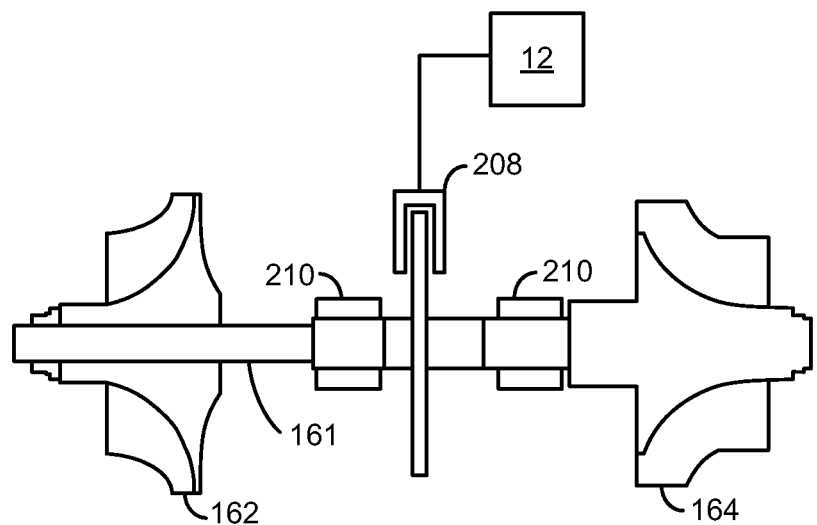
FIGS. 2-5 show example devices for increasing rotational resistance of a turbocharger.

Referring now to FIG. 2, a cross section of a first device for increasing rotational resistance of a turbocharger is shown. Turbine 164 is shown mechanically coupled to shaft 161. Compressor 162 is also shown mechanically coupled to shaft 161. Rotor 170 is also shown mechanically coupled to shaft 161. Brake caliper 171 straddles rotor 170. Controller 12 applies and releases caliper 171. Shaft 161 is supported via bearings 210.

During engine operation, exhaust gases act on turbine 164 to cause it to rotate if caliper is not applied (e.g., providing a clamping force) or if a small force is applied to rotor 170. The rotational resistance of shaft 161, turbine 164, and compressor 162 may be increased by applying a braking force to rotor 170 via caliper 171. Caliper 171 may be electrically or hydraulically operated. Rotational resistance of shaft 161, turbine 164, and compressor 162 decreases when a braking force applied to rotor 170 via caliper 171 is released. In one example, the rotational resistance of shaft 161, turbine 164, and compressor 162 may be increased when a temperature of an exhaust after treatment device is below a threshold temperature.

Figure 3:
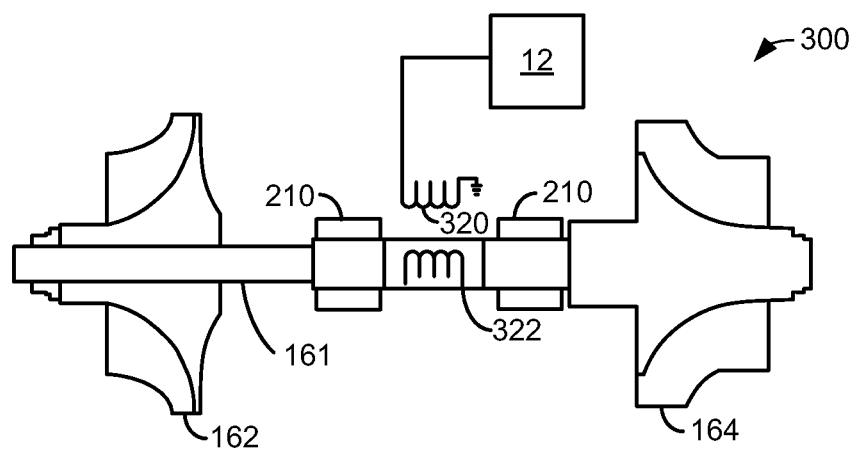

Referring now to FIG. 3, a cross section of an alternative device 300 for increasing rotational resistance of a turbocharger is shown. The components of device 300 that have the same numbers as the components of the device shown in FIG. 2 are the same components as shown in FIG. 2, and the components operate as discussed in the description of FIG. 2.

Device 300 includes a first winding 320 and permanent magnets or second winding 322. Controller 12 selectively supplies current to winding 320 to create a magnetic field which can increase or decrease the rotational resistance of turbine 164, shaft 161, and compressor 162. The magnetic field produced by supplying coil 320 with current interacts with a magnetic field of shaft 161 produced by permanent magnets or windings 322. When electrical device 322 is a winding, current may be supplied to the winding to produce a magnetic field that interacts with the field produce via winding 320. The two magnetic fields act to increase the rotational resistance of shaft 161, turbine 164, and compressor 162. Ceasing or reducing current flow to winding 320 reduces rotational resistance of shaft 161.

Figure 4:
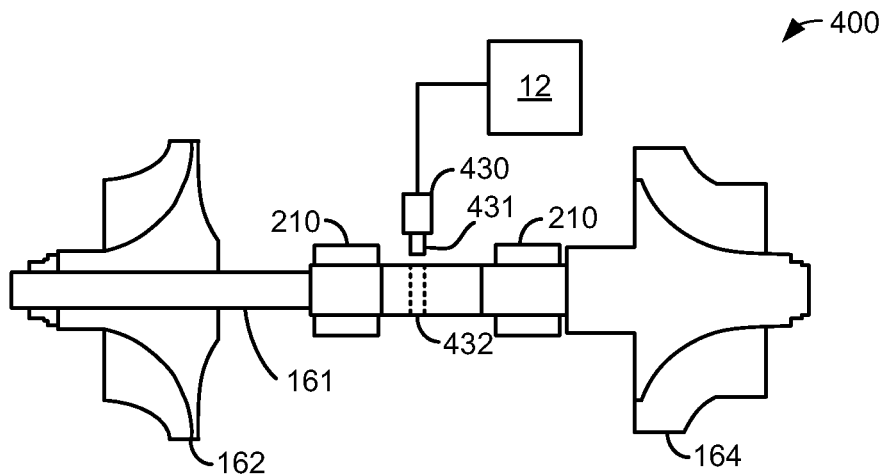

Referring now to FIG. 4, a cross section of an alternative device 400 for increasing rotational resistance of a turbocharger is shown. The components of device 400 that have the same numbers as the components of the device shown in FIG. 2 are the same components as shown in FIG. 2, and the components operate as discussed in the description of FIG. 2.

Device 400 includes an electrical actuator (e.g., a solenoid) or hydraulic actuator (e.g., a piston) 430 that selectively extends or retracts pin 431 into hole 432 located on shaft 161. For example, in response to a request to start an engine when a temperature of an exhaust after treatment device is less than a threshold temperature, pin 431 is extended to shaft 161. If pin 431 is aligned with hole 432, pin 431 extends into shaft 161 to limit rotation of shaft 161, turbine 164, and compressor 162. If pin 431 is not initially aligned with hole 432, shaft 161 is rotated by exhaust gases acting on turbine 164 until pin 431 aligns with and moves into hole 432. Thus, device 400 provides an alternative way to increase the rotational resistance to movement of shaft 161.

Figure 5:
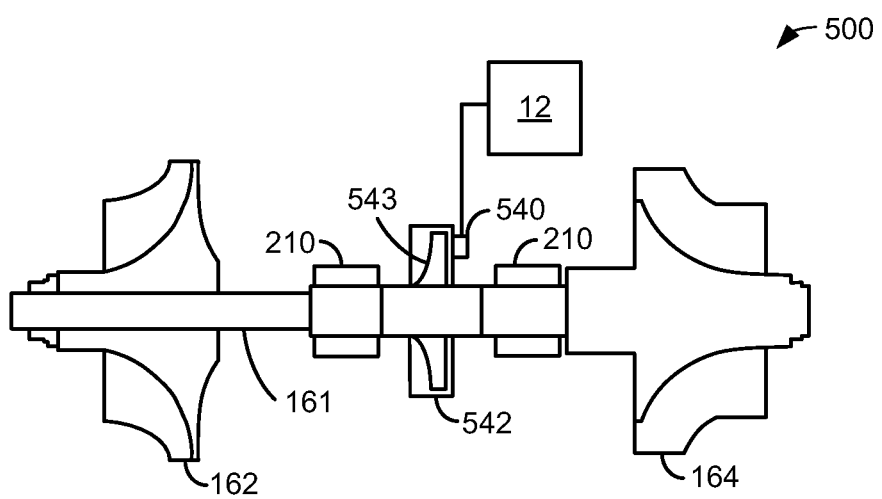

Referring now to FIG. 5, a cross section of an alternative device 400 for increasing rotational resistance of a turbocharger is shown. The components of device 500 that have the same numbers as the components of the device shown in FIG. 2 are the same components as shown in FIG. 2, and the components operate as discussed in the description of FIG. 2.

Device 500 includes a hydraulic flow control device (e.g., a valve) 540 and a hydraulic pump 542. Hydraulic pump is integrated into shaft 161 and may include vanes 543. Rotational resistance of shaft 161 is controlled via adjusting flow of hydraulic fluid to hydraulic pump 542 via hydraulic flow control device 540. In one example, rotational resistance of hydraulic pump 542 is increased in response to a temperature of the engine or a temperature of an exhaust after treatment device being less than a threshold temperature.

Thus, the system described in FIGS. 1-5 provides for an engine system, comprising: an engine; a turbocharger coupled to the engine, the turbocharger including a device for increasing and decreasing a rotational resistance of the turbocharger; and a controller including non-transient instructions to adjust the rotational resistance of the turbocharger via the device in response to a temperature of an after treatment device. By adjusting the turbocharger rotational resistance responsive to a temperature of an after treatment device, it may be possible to improve engine emissions and reduce fuel consumption.

The system of FIGS. 1-5 also provides for an engine system where the device is a hydraulically actuated device, and where the rotational resistance of the turbocharger is adjusted in response to the temperature of the after treatment device being less than a threshold temperature. The engine system includes where the device is an electrically actuated device. The engine system includes where the device is a brake. The engine system includes where the brake includes a rotor in mechanical communication with a turbocharger shaft. The engine system also includes where the device is an electric machine. The engine system further includes where the electric machine is an alternator.

In another example, the system of FIGS. 1-5 provides for an engine system, comprising: an engine; a turbocharger coupled to the engine, the turbocharger including a device for increasing and decreasing rotational resistance of the turbocharger; and a controller including non-transitory instructions to adjust the rotational resistance of the turbocharger via the device in response to a temperature of an after treatment device, the controller including further non-transitory instructions to adjust turbocharger rotational resistance in response to an engine demand torque. In this way, the turbocharger rotational resistance can be adjusted to increase exhaust energy delivered to an after treatment device, or to improve engine output torque.

The engine system of FIGS. 1-5 also includes where the device is in mechanical communication with a turbocharger shaft. The engine system further comprises a turbocharger waste gate and additional non-transitory instructions to open the waste gate in response to engine air flow less than a desired level. In some examples, the engine system further comprises additional non-transitory instructions to adjust turbocharger rotational resistance in response to barometric pressure. The engine system includes where the device is a disk brake. The engine system includes where the device is a hydraulic pump. The engine system further comprises additional instructions to increase rotational resistance of the turbocharger after a predetermined number of combustion events since engine stop.

Figure 6:
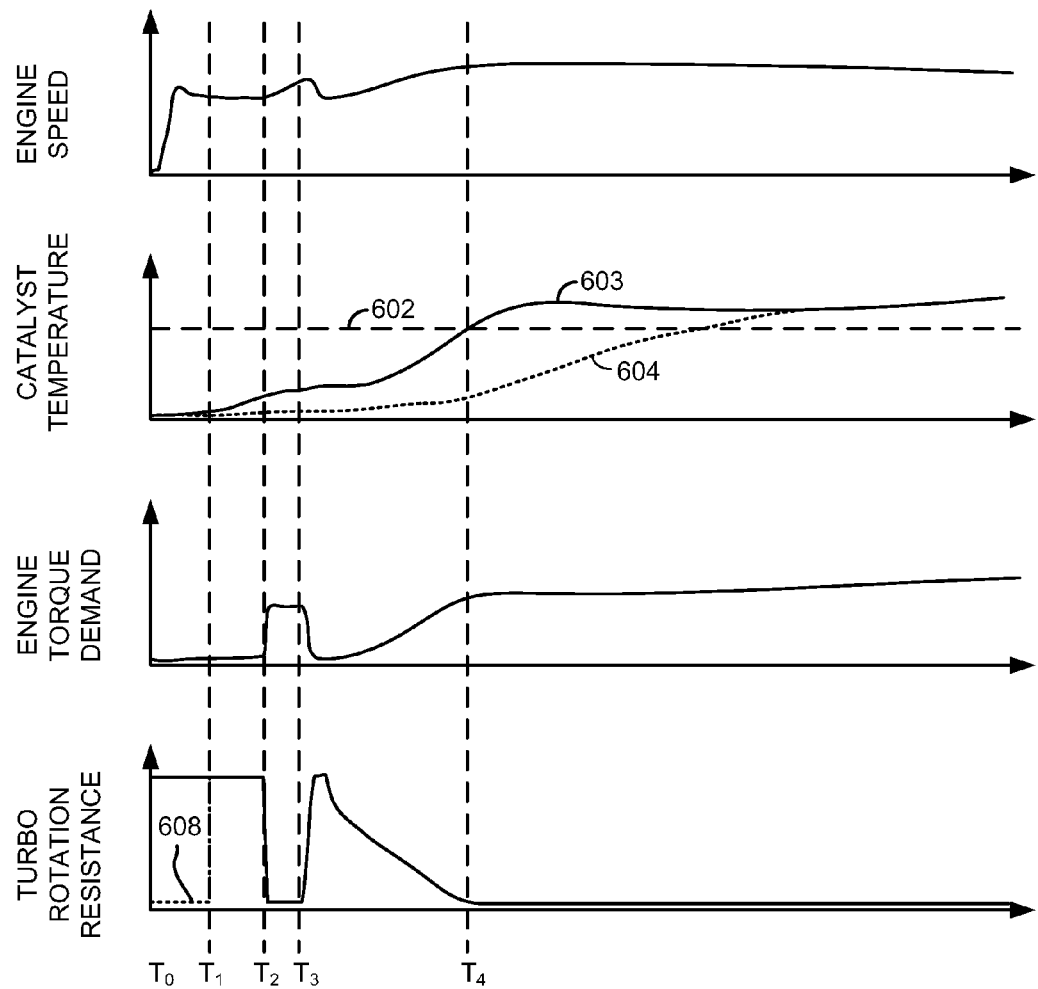
FIG. 6 shows an simulated engine cold starting sequence.

Referring now to FIG. 6, a simulated engine cold starting sequence is shown. The sequence of FIG. 6 may be provided by the system shown in FIG. 1 executing the method of FIG. 7. Vertical markers $T_0$-$T_3$ represent specific times of interest in the sequence.

The first plot from the top of FIG. 6 represents engine speed versus time. The Y axis represents engine speed and engine speed increases in the direction of the Y axis arrow. The X axis represents time and time increases from the left side of the figure to the right side of the figure.

The second plot from the top of FIG. 6 represents catalyst temperature versus time. The Y axis represents catalyst temperature and catalyst temperature increases in the direction of the Y axis arrow. The X axis represents time and time increases from the left side of the figure to the right side of the figure. Horizontal line 602 represents a threshold after treatment device temperature. The rotational resistance of the turbocharger may be increased in response to the temperature of the after treatment device being less than the threshold temperature. The rotational resistance of the turbocharger may be decreased in response to the temperature of the after treatment device being greater than the threshold temperature. Line 603 represents catalyst temperature when turbocharger rotational resistance is increased. Line 604 represents catalyst temperature during similar condition, but where turbocharger rotational resistance is at a low level.

The third plot from the top of FIG. 6 represents engine torque demand versus time. The Y axis represents engine torque demand and engine torque demand increases in the direction of the Y axis arrow. The X axis represents time and time increases from the left side of the figure to the right side of the figure.

The fourth plot from the top of FIG. 6 represents turbocharger rotational resistance (e.g., resistance to motion) versus time. The Y axis represents turbocharger rotational resistance and rotational resistance increases in the direction of the Y axis arrow. The X axis represents time and time increases from the left side of the figure to the right side of the figure. Trace 608 shows increasing rotational resistance of the turbocharger at an alternative timing.

At time $T_0$, the engine is stopped, catalyst temperature is low, torque demand is zero, and the turbocharger rotational resistance is at a high level. The turbocharger rotational resistance may be increased after an engine stop or upon a request to start the engine.

Between time $T_0$ and time $T_1$, the engine is started as indicated by engine speed increasing. The catalyst temperature also begins to increase and the engine torque demand is low. Since rotational resistance of the turbocharger is increased and turbine rotation is limited, exhaust gases are in contact with fewer turbine vanes as compared to when rotational resistance of the turbocharger is low. By exposing exhaust gases to fewer turbine vanes, it may be possible to retain more energy in exhaust gases that reach a downstream after treatment device.

Trace 608 shows turbocharger rotational resistance increasing after the engine is started. In some examples, turbine rotational resistance is increased after a predetermined amount of time or combustion events since engine stop so that exhaust back pressure may not be elevated so quickly as to degrade combustion stability. Thus, in some examples, the turbine may be permitted to rotate for a short duration after the engine reaches idle speed, for example.

At time $T_1$, the engine torque demand increases at a time when catalyst temperature is less than the threshold temperature 602. In some examples, it may be desirable to provide the requested engine torque even though the catalyst temperature is not above the desired temperature so that a vehicle the engine is coupled to accelerates in a desired manner. The turbocharger rotational resistance is reduced in response to the increasing engine torque demand. In some examples, the turbocharger rotational resistance will not be reduced until the engine torque demand exceeds a threshold engine torque demand. Engine speed increases as engine torque output increases and catalyst temperature continues to increase.

At time $T_2$, the engine torque demand is decreased. Further, the turbocharger rotational resistance is increased in response to the decrease in engine torque demand. Increasing the turbocharger rotational resistance again limits the number of turbine vanes that exhaust gases are exposed to so that more exhaust gas energy may be transferred to the catalyst.

Between time $T_2$ and time $T_3$, the catalyst temperature continues to increase and the engine torque command also increases after a period of being at a low level. The turbocharger rotational resistance is progressively decreased. However, in some examples the turbocharger rotational resistance may remain at a constant high value until the catalyst reaches the threshold temperature or until the engine torque demand exceeds a threshold engine torque demand.

At time $T_3$, the turbocharger rotational resistance is reduced to a low level in response to the catalyst temperature reaching a threshold temperature. The engine torque demand and speed increase responsive to operator demand.

In this way, performance of a catalyst or after treatment device after a cold engine start may be improved. Further, as shown, engine performance may be maintained by selectively decreasing turbocharger rotational resistance.

Figure 7:
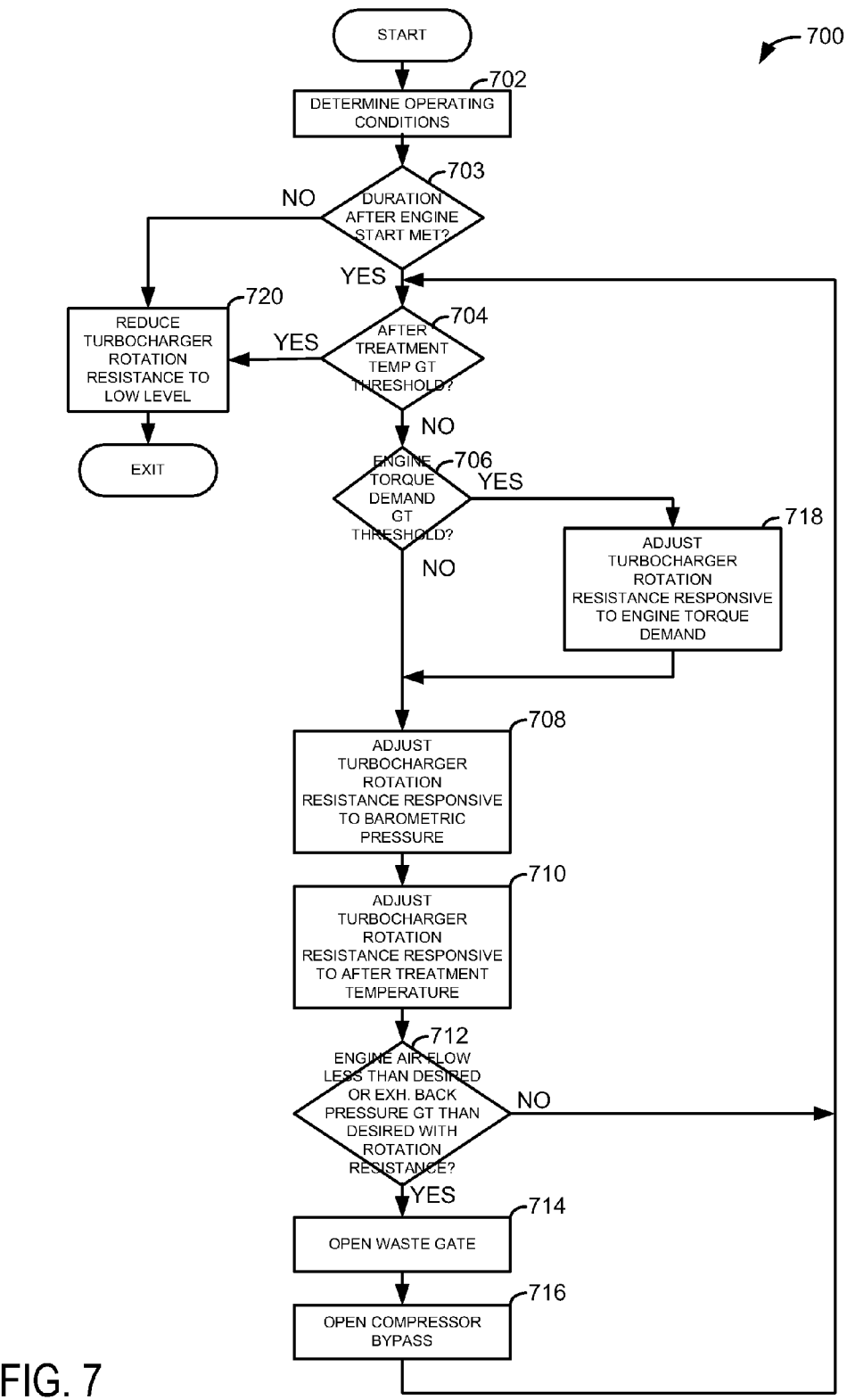
FIG. 7 shows an example method for operating an engine.

Referring now to FIG. 7, a method for improving starting of a turbocharged engine is shown. The method of FIG. 7 may be performed in the system shown in FIG. 1 via executing instructions stored in non-transitory memory of controller 12.

At 702, method 700 determines operating conditions. Operating conditions may include but are not limited to engine speed, engine load, catalyst temperature, engine temperature, engine torque demand, and turbocharger rotational resistance. Method 700 proceeds to 703 after operating conditions are determined.

At 703, method 700 judges whether or not a specified duration since engine start has elapsed. In some examples, the specified duration is an amount of time since the engine was in a stopped state. In other examples, the specified duration is a number of combustion events since the engine was stopped. In other examples, the specified duration is immediately at a time of an engine start request. If method 700 judges that the specified duration after engine start has been met, the answer is yes and method 700 proceeds to 704. Otherwise, the answer is no and method 700 proceeds to 720.

At 704, method 700 judges whether or not a temperature of the engine and/or an after treatment device (e.g., catalyst or particulate filter) is greater than a threshold temperature. In one example, the temperature of a catalyst is compared to a catalyst light off temperature (e.g., a temperature at which a catalyst has some threshold level of efficiency). If method 700 judges that the temperature of the engine and/or after treatment device is greater than a threshold temperature, the answer is yes and method 700 proceeds to 720. Otherwise, the answer is no and method 700 proceeds to 706.

At 720, method 700 reduces turbocharger rotational resistance to a low level so that the turbocharger efficiency may be increased. The turbocharger rotational resistance may be lowered by releasing a brake, reducing current supplied to a circuit, or adjusting a hydraulic actuator. Rotational resistance of devices shown in FIGS. 2-5 may be adjusted to a lower level as previously described. Method 700 proceeds to exit after the rotational resistance of the turbocharger is decreased to a lower level.

At 706, method 700 judges whether or not the engine torque demand is greater than a threshold torque demand. If so, method 700 proceeds to 718. Otherwise, method 700 proceeds to 708.

At 718, method 700 adjusts rotational resistance responsive to the engine torque demand. In one example, the turbocharger rotational resistance is reduced proportionately with an increasing engine torque demand. For example, torque applied to a caliper clamping a rotor couple to a turbocharger shaft can be decreased in response to an increasing engine torque request. In other examples, the turbocharger rotational resistance can be adjusted to a low level in response to desired engine torque greater than a threshold engine torque. Method 700 proceeds to 708 after turbocharger rotational resistance is adjusted.

At 720, method 700 adjusts turbocharger rotational resistance according to barometric pressure. In one example, the rotational resistance of the turbocharger is decreased with decreasing barometric pressure so that the turbocharger compressor may provide some pressurized air to the engine after engine starting when the engine is started at higher altitudes. The turbocharger rotational resistance adjustment may be empirically determined and stored in memory. Method 700 proceeds to 710 after turbocharger rotational resistance is adjusted for barometric pressure.

At 710, method 700 adjusts turbocharger rotational resistance in response to engine and/or after treatment device temperature. In one example, turbocharger rotational resistance may be decreased with increasing engine and/or after treatment device temperature. The amount of decrease in rotational resistance may be empirically determined and store in memory indexed via engine and/or after treatment device temperature. Further, the initial turbocharger rotational resistance at starting may be adjusted according to engine and/or after treatment device temperature. For example, as engine and/or after treatment device temperature decreases, rotational resistance of the turbocharger is increased. In one example, the rotational resistance is increased so that turbocharger turbine speed is substantially zero (e.g., less than 2 RPM). In another example, rotational resistance is increased so that turbine speed is less than a threshold turbine speed, 100 RPM for example. Method 700 proceeds to 712 after turbocharger rotational resistance is adjusted.

At 712, method 700 judges whether or not engine air flow is less than a desired engine air flow or if exhaust back pressure is greater than a desired back pressure at the present rotational resistance of the turbocharger. If engine air flow is less than desired or if exhaust back pressure is higher than desired, the answer is yes and method 700 proceeds to 714. Otherwise, the answer is no and method 700 returns to 704.

At 714, method 700 opens the turbocharger waste gate to increase exhaust flow, thereby increasing engine air flow and decreasing exhaust back pressure. The waste gate may be operated via vacuum or electrically. In one example, the opening amount of the waste gate is increased proportional to the desired exhaust back pressure reduction or proportional to the desired increase in engine air flow. Method 700 proceeds to 716 after the waste gate is opened.

At 716, method 700 increases engine air flow via opening a compressor bypass valve. Since increasing turbocharger rotational resistance limits compressor rotation, additional air may be provided to the engine via bypassing the compressor. The compressor bypass valve may be completely or partially opened to increase engine air flow. Method 700 returns to 704 after the compressor bypass is opened.

In this way, turbocharger rotational resistance may be increased above a nominal rotational resistance resulting from bearing drag and turbocharger inertia. The increased rotational resistance can reduce after treatment device activation time and may therefore reduce fuel consumption.

Thus, the method of FIG. 7 provides for 15. an engine control method, comprising: adjusting a rotational resistance of a turbocharger so that a turbine speed of the turbocharger is substantially zero in response to a temperature of an engine exhaust after treatment device while an engine supplies exhaust to the turbocharger. In this way, additional exhaust gas energy may be transferred to an after treatment device so that the engine may operate more efficiently during after treatment device warm-up. The engine control method further comprises adjusting the rotational resistance of the turbocharger in response to barometric pressure.

In another example, the engine control method further comprises adjusting the rotational resistance of the turbocharger in response to an engine torque demand. The engine control method further comprises opening a waste gate in response to an engine air flow amount while the rotational resistance is greater than a threshold level. The engine control method includes where increasing the rotational resistance of the turbocharger includes increasing rotational resistance of a turbocharger shaft. The engine control method includes where the rotational resistance is increased in response to the temperature of the engine exhaust after treatment device being less than a threshold temperature.

As will be appreciated by one of ordinary skill in the art, the method described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating on natural gas, gasoline, diesel, or alternative fuel configurations could use the present description to advantage.

The invention claimed is:

1. An engine system, comprising:
an engine;
a turbocharger coupled to the engine, the turbocharger including a device for increasing and decreasing a rotational resistance of the turbocharger, where the device is an electric machine; and
a controller including instructions stored in non-transient memory to adjust the rotational resistance of the turbocharger via the device in response to a temperature of an after treatment device, additional instructions to decrease turbocharger rotational resistance via the device in response to decreasing barometric pressure, additional instructions to open a waste gate in response to engine air flow less than a desired engine air flow when the temperature of the after treatment device is less than a threshold and the rotational resistance of the turbocharger is adjusted via the device, and additional instructions to reduce the turbocharger rotational resistance via the device in response to the temperature of the after treatment device being greater than the threshold.

2. The engine system of claim 1, further comprising additional instructions to proportionately reduce the rotational resistance of the turbocharger in response to an increasing engine torque demand.

3. The engine system of claim 1, further comprising additional instructions to open the waste gate in response to engine air flow less than the desired engine air flow, engine torque demand less than a threshold, and the after treatment device temperature less than the threshold.

4. The engine system of claim 1, where the electric machine includes windings, and further comprising additional instructions to not decrease the rotational resistance of the turbocharger via the device in response to a torque demand until the torque demand is greater than a threshold.

5. An engine system, comprising:
an engine;
a turbocharger coupled to the engine, the turbocharger including a device for increasing and decreasing rotational resistance of the turbocharger, the device in mechanical communication with a turbocharger shaft that mechanically couples a turbine and a compressor, the turbocharger also including a turbocharger waste gate; and
a controller including instructions stored in non-transitory memory to adjust the rotational resistance of the turbocharger via the device in response to a temperature of an after treatment device, the controller including further non-transitory instructions to proportionately adjust the turbocharger rotational resistance via the device in response to an engine demand torque, additional instructions to increase the rotational resistance of the turbocharger after a predetermined number of combustion events since engine stop, and additional non-transitory instructions to open the waste gate in response to engine air flow less than a desired level, and additional instructions to not adjust turbocharger rotational resistance via the device in response to the engine demand torque until the engine demand torque exceeds a threshold.

6. The engine system of claim 5, where the device comprises a solenoid and a pin, the device in mechanical communication with a hole in the turbocharger shaft, and further comprising additional instructions to open the waste gate in further response to exhaust back pressure greater than a desired pressure.

7. The engine system of claim 5, further comprising additional non-transitory instructions to decrease turbocharger rotational resistance in response to decreasing barometric pressure.

8. The engine system of claim 5, where the device is a disk brake, and where adjusting turbocharger rotational resistance includes decreasing turbocharger rotational resistance in response to an increasing engine demand torque.

9. The engine system of claim 6, where the device is a hydraulic pump, and further comprising additional instructions to decrease rotational resistance of the turbocharger before a predetermined number of combustion events since engine stop.

10. An engine control method, comprising:
  decreasing rotational resistance of a turbocharger turbine via a device before a predetermined number of combustion events since engine stop;
  increasing the rotational resistance of the turbocharger turbine via the device so that a turbine speed of a turbocharger is substantially zero in response to a temperature of an engine exhaust after treatment device while an engine supplies exhaust to the turbocharger;
  proportionately reducing the rotational resistance of the turbocharger turbine via the device in response to an increase in an engine torque demand; and
  not adjusting the rotational resistance of the turbocharger turbine in response to the engine torque demand unless the engine torque demand exceeds a threshold.

11. The engine control method of claim 10, further comprising decreasing the rotational resistance of the turbocharger turbine in response to decreasing barometric pressure.

12. The engine control method of claim 10, further comprising opening a waste gate in response to an engine air flow amount while the rotational resistance of the turbocharger turbine is greater than a threshold level.

13. The engine control method of claim 10, where increasing the rotational resistance of the turbocharger turbine includes inserting a pin into a hole in a turbocharger shaft.

14. The engine control method of claim 10, where the rotational resistance of the turbocharger turbine is increased in response to the temperature of the engine exhaust after treatment device being less than a threshold temperature.

* * * * *